(12) United States Patent
Stopfer et al.

(10) Patent No.: US 11,648,726 B2
(45) Date of Patent: May 16, 2023

(54) METHOD AND A DEVICE FOR INSPECTING A PROCESS OF FORMING PLASTIC PREFORMS INTO PLASTIC CONTAINERS AND IN PARTICULAR PLASTIC BOTTLES

(71) Applicant: KRONES AG, Neutraubling (DE)

(72) Inventors: Andreas Stopfer, Regensburg (DE); Stefan Piana, Koefering (DE); Stefan Schober, Tegernheim (DE)

(73) Assignee: KRONES AG

( * ) Notice: Subject to any disclaimer, the term of this patent is extended or adjusted under 35 U.S.C. 154(b) by 0 days.

(21) Appl. No.: 16/645,578

(22) PCT Filed: Sep. 7, 2018

(86) PCT No.: PCT/EP2018/074108
§ 371 (c)(1),
(2) Date: Mar. 9, 2020

(87) PCT Pub. No.: WO2019/048598
PCT Pub. Date: Mar. 14, 2019

(65) Prior Publication Data
US 2020/0298463 A1 Sep. 24, 2020

(30) Foreign Application Priority Data
Sep. 7, 2017 (DE) ..................... 10 2017 120 612.4

(51) Int. Cl.
*B29C 49/80* (2006.01)
*B29B 11/14* (2006.01)
(Continued)

(52) U.S. Cl.
CPC .............. *B29C 49/80* (2013.01); *B29B 11/14* (2013.01); *B29C 49/36* (2013.01);
(Continued)

(58) Field of Classification Search
CPC ....... B29C 49/36; B29C 49/421; B29C 49/80; B29C 49/06; B29C 2949/78092; B29B 11/14; B29L 2031/7158
See application file for complete search history.

(56) References Cited

U.S. PATENT DOCUMENTS

| | | |
|---|---|---|
| 8,593,515 B2 | 11/2013 | Detrois et al. |
| 8,806,840 B2 | 8/2014 | Bierschneider ......... B67C 3/007 |

(Continued)

FOREIGN PATENT DOCUMENTS

| | | | |
|---|---|---|---|
| CN | 101278192 | 10/2008 | ............. G01N 21/90 |
| CN | 103477212 | 12/2013 | ............. G01N 21/90 |

(Continued)

OTHER PUBLICATIONS

German Search Report (w/machine translation) issued in application No. 10 2017 120 612.4, dated Aug. 10, 2018 (14 pgs).

(Continued)

*Primary Examiner* — Monica A Huson
(74) *Attorney, Agent, or Firm* — Hayes Soloway P.C.

(57) ABSTRACT

A method for inspecting a device for forming plastic preforms into plastic containers, the device having a transport unit, at which a plurality of forming stations for forming plastic preforms into plastic containers is arranged, and an inspection unit that is arranged after the forming stations in a transport direction of the plastic containers and that determines a wall thickness of these plastic containers in at least one region of the plastic containers produced, includes the following steps:
  introducing at least one test container that has a predetermined and/or known wall thickness a least in sections, and
  determining a first wall thickness in at least one area of the container by the inspection unit.

15 Claims, 1 Drawing Sheet

(51) Int. Cl.
    *B29C 49/36*      (2006.01)
    *B29C 49/42*      (2006.01)
    *B29L 31/00*      (2006.01)
    *B29C 49/78*      (2006.01)

(52) U.S. Cl.
    CPC ........ *B29C 49/42069* (2022.05); *B29C 49/78* (2013.01); *B29L 2031/7158* (2013.01)

(56) References Cited

U.S. PATENT DOCUMENTS

| | | | |
|---|---|---|---|
| 9,244,020 B2 | 1/2016 | Leconte et al. | G01N 21/958 |
| 9,346,213 B2 | 5/2016 | Haner et al. | B29C 49/78 |
| 2015/0037518 A1* | 2/2015 | Haner | B29C 49/12 |
| | | | 428/29 |

FOREIGN PATENT DOCUMENTS

| | | | |
|---|---|---|---|
| DE | 102011056627 | 6/2013 | B29C 49/78 |
| EP | 1279002 | 12/2005 | G01B 11/06 |
| EP | 2284120 | 2/2011 | B65B 57/02 |
| EP | 2835248 | 2/2015 | B29B 11/08 |

OTHER PUBLICATIONS

International Search Report and Written Opinion (w/translations) issued in application No. PCT/EP2018/074108, dated Dec. 10, 2018 (21 pgs).

Chinese Official Action (w/translation) issued in application No. 201880056805.4, dated Jun. 29, 2021 (22 pgs).

* cited by examiner

METHOD AND A DEVICE FOR INSPECTING A PROCESS OF FORMING PLASTIC PREFORMS INTO PLASTIC CONTAINERS AND IN PARTICULAR PLASTIC BOTTLES

BACKGROUND OF THE INVENTION

Plastic containers, for example made of PET, are often produced from plastic preforms on stretch blow moulding machines. It is known that plastic preforms are first heated and in this heated state are formed into plastic bottles by a gaseous medium and in particular compressed air and are in particular blown. In principle, it would also be possible for the plastic preforms to be expanded directly by a liquid such as in particular, but not exclusively, a product to be filled in.

In order to ensure the quality of the products and thus also of a production process, it is to known from the prior art that an inspection system in the outlet of a machine carries out a check, for example, of a wall thickness profile of the blown containers. If the production process shows defects, this is usually reflected in an inadequate distribution of the container material or the wall thickness along the side walls and especially along the side walls in the direction of a container axis or in a longitudinal direction of the containers. In order to ensure the proper functioning of this inspection system and to detect possible failures or incorrect measurements at an early stage, it is known from the prior art to carry out destructive tests. This means that individual containers removed from the production process are cut up and measured accordingly.

Cutting up and measuring the containers therefore involves both material and, in particular, personnel costs. The material expenditure includes both the destroyed container and the testing and measuring equipment. The laboratory personnel is to be mentioned as personnel expenditure. In addition, this manual method is also highly error-prone, especially with regard to documentation.

The present invention is therefore based on the object of providing a test procedure and, in particular, an automated test container program in order to provide evidence of the correct functioning of an inspection device and, in particular, a sidewall measuring unit that significantly reduces the effort and sources of error of the prior art.

SUMMARY OF THE INVENTION

In a method according to the invention for inspecting a device for forming plastic preforms into plastic containers, the device has a transport unit on which a plurality of forming stations for forming plastic preforms into plastic containers is arranged, and an inspection unit that is arranged downstream of the forming stations in a transport direction of the plastic containers and that determines a physical property of the plastic containers and in particular a wall thickness of the plastic containers or their plastic material in at least one region of the plastic containers produced. It is possible to determine the wall thickness directly. However, it would also be possible to determine the wall thickness indirectly, for example by means of another measured value such as a transparency of the wall.

According to the invention, the following steps are carried out, after which a test container is first introduced, which has a predetermined and/or known wall thickness at least in sections. In a further method step, this first wall thickness is checked in at least one area of the container, in particular with the aid of the inspection unit. Preferably, the inspection unit itself is also checked by this inspection or measurement of the wall thickness.

It is therefore proposed that this test be carried out in a specifically dedicated test container program. For example, it is possible for this program to be carried out after a production start, after a change of type, or after a change of user and/or at predetermined and in particular regular intervals. Furthermore, the test container program can also be started manually if required. In particular, the measured values are stored and/or logged, and this storage is preferably also carried out with a date and in particular also with other variables, such as parameters which clearly identify the corresponding test container.

It is preferred to empty a machine before carrying out the process described here, i.e. the containers are removed from the production line or no further plastic preforms or containers are fed in.

Preferably, each of the forming stations has a blow mould, and this blow mould forms a cavity in its interior, within which the plastic preforms can be formed into plastic containers. Furthermore, this blow mould particularly preferably has side parts and a bottom part, which together form said cavity.

In a preferred method, the test containers are test containers produced by the device itself, i.e. in particular blow-moulded containers.

In particular therefore, a test container program is proposed, which is called up, for example, after a program start, after a change of type, when a user changes, and particularly preferably also at regular intervals. For example, a column light or a horn signal indicates to a machine operator that they should bring the test containers provided for a current container type into the production flow. This can be done, for example, by idling and stopping a stretch blow moulding machine and preferably by manually latching the test containers into corresponding holding clamps of the device. For this purpose, as described in more detail below, the fixture preferably has an area where a user can latch in containers in this way. The preferred method is to feed not only individual test containers, but a set of test containers. This set of test containers can have different wall thicknesses. It is therefore preferable to create a possibility to feed a plurality of test containers and in particular a set of test containers to the plant in a specified area, especially during a machine standstill.

In a preferred method, a wall thickness determined by the inspection unit is compared with a known wall thickness. In this way it is possible to check the inspection unit itself. As mentioned above, a test container can be introduced into the production flow and the measured wall thickness compared with a given or known wall thickness of the test container. Test containers with several wall thicknesses and also with different heights as well as one test container with only one wall thickness can be used.

In another preferred method, the at least one test container is introduced after the forming stations in a transport direction of the plastic containers.

In a further preferred method, the inspection unit determines the wall thickness of the plastic container in several areas of the plastic container, these several areas preferably being arranged one above the other in a longitudinal direction of the plastic container. Particularly preferably, the inspection unit determines the wall thickness in at least two such areas, preferably in at least three such areas, preferably in at least four such areas and particularly preferably in at least five such areas.

In a further preferred method, the test container has wall thicknesses that deviate in its longitudinal direction.

As mentioned above, preferably several test containers are introduced into the process or are checked by means of the inspection unit. In this way the accuracy of the inspection can be enhanced and in particular the inspection unit can be tested in different measuring ranges. In particular, individual sensor elements of the inspection unit can also be reliably tested.

Another preferred method is to check whether the wall thickness value determined by the inspection unit is within a certain tolerance range. A tolerance range can be established around the actual wall thickness of the test container. If a value for the wall thickness measured by the inspection unit is within this tolerance range, the respective sensor unit is considered to be in order. The definition of such windows or tolerances and also the further procedure in case of exceeding or falling below these tolerances is the responsibility of the qualified personnel.

In a preferred method, the test containers are additionally marked in a suitable manner, for example by a two-dimensional code, a reflective strip or transponder, and are preferably also recognised as such by the inspection unit. In this way, the test containers can in any case be channelled out of a production stream after inspection.

Once all of the test containers have passed through the machine, it is preferably checked whether all specifications for the inspection unit have been met. If this is the case, the test mode or test procedure can be terminated and production can be started or continued. In case they are not met, the operator is preferably requested to retest the undetected containers.

If a test run is unsuccessful several times, the machine can preferably be stopped. In particular, a person skilled in the art can decide on the further procedure, such as troubleshooting, and can also decide which actions should be carried out.

It is particularly preferred that each test result is logged and saved. This can be done in a log file, for example.

This log file can also be used for logging and the respective test results can be listed in detail. Preferably, the test containers are produced by the forming device itself. Such a test container can be produced for example by means of the apparatus itself, such as by stretch blow moulding of plastic preforms with too high or too low a weight or also by deliberately adjusting parameters of the production machine, for example by deliberately adjusting the temperature in the different heating zones of an oven to heat the plastic preforms.

The procedure according to the invention can eliminate the sources of error that arise from manual inspection and documentation. Furthermore, savings in terms of personnel, testing equipment and also produced containers can be made.

In a preferred method, an automated documentation of the recorded results is carried out. This automated documentation also helps to avoid sources of error. To be more precise, each inspection of the test containers can be logged and, in particular, also be associated with the respective tested container. In particular, the results and in particular the results of the comparison between the measured wall thicknesses and the actual wall thicknesses of the containers can also be logged. This automated documentation can also be stored automatically, for example, it can be automatically stored in the central EDP system of the machine or of a company. In this way, a demonstrably high product quality can be ensured.

In another preferred method, data is output for at least one test container, and in particular wall thicknesses which are characteristic of the test container. This data can be output, for example, via a display unit such as a display. It is particularly preferred to output this data in a graphical representation, for example as a histogram. It is possible to output a histogram with actual values, i.e. with measured wall thicknesses, as well as a comparison diagram showing the corresponding actual reference values of the wall thicknesses.

In another preferred method, a log of the checks carried out is generated. In such a log, for example, a time profile can be stored. Time stamps can also be provided or created. In addition, the log can also record which user carried out the respective measurements.

In addition, the results, in particular measurement results can also be logged, from which it can be concluded which sensor units provide measurement results that lie within a specified to tolerance window. Preferably, such tolerance windows can be specified and, in particular, modified by the user. These can be tolerance windows that determine which deviations between measured values for the wall thickness and the actual and known values for the wall thickness are still acceptable.

In this context, it is pointed out that although the present invention has been described with reference to the wall thickness of containers, other measured values could also be recorded, such as a transparency of the walls, the function of a bottom inspection, an ovality inspection of the mouth, a bottom section weight, a side wall inspection, a physical density, the presence of imperfections and the like.

The present invention is further directed to a device for forming plastic preforms into plastic containers. This device comprises a transport unit on which a plurality of forming stations for forming plastic preforms into plastic containers is arranged, as well as an inspection unit that is arranged after the forming stations in the transport direction of the plastic containers and that determines a physical property of the plastic containers produced and in particular a wall thickness of these plastic containers in at least one region thereof.

According to the invention, the device has an introduction area within which already formed plastic containers (especially as test containers) can be fed to the machine. This introduction area is preferably accessible to a user. Alternatively or additionally, this introduction area is accessible to a further unit, such as a robot unit or a further transport unit such as a transport star.

It is therefore proposed that means be provided by which containers and in particular test containers can be fed to the machine. In particular, this area is suitable and intended for manually feeding such test containers to the machine. However, it would also be possible for the test containers to be fed directly and automatically, for example from a magazine for test containers. Thus, the machine may have a magazine in which test containers, in particular sets of test containers and in particular also different sets of test containers are arranged. The user can select which test containers and/or which sets of test containers are to be fed to the device. The inspection unit can use these test containers to check whether the inspection unit itself is working properly.

In another preferred embodiment, the device also has a removal area where the test containers are removed from the device. This removal area is preferably located in a transport direction of the plastic containers downstream of the introduction area. However, it would also be possible for the removal area and the introduction area to be located in the same areas of the machine, for example in a predetermined area of a transport star. Another preferred embodiment could also provide for the automated introduction and removal of the containers. For example, individual test containers or sets of test containers could be transported by a transport unit from a magazine to the inspection unit and, after checking the inspection unit, be transported back to the magazine unit.

In a preferred embodiment, the device therefore has a magazine unit in which at least individual and preferably sets of test containers can be stored. This magazine unit can preferably be coupled to the device for transport, so that containers can be transported from the magazine unit to the inspection unit, in particular via the above-mentioned introduction area.

In a further advantageous embodiment, the device has a comparison unit that is suitable and intended for comparing wall thicknesses determined by the inspection unit with reference wall thicknesses, i.e. actual wall thicknesses, of the respective test containers.

In a preferred embodiment, as mentioned above, the forming stations each have blow moulds that serve to expand the plastic preforms. In a further preferred embodiment, the forming stations are each equipped with pressurizing units such as blow nozzles, which apply a free-flowing medium onto the plastic preforms to expand them. This flowable medium is in particular air and especially compressed air. However, it is also possible that the flowable medium is a liquid such as the beverage to be filled in.

In a further advantageous embodiment, the forming stations each have rod-like bodies that can be inserted into the plastic preforms in order to stretch them in the longitudinal direction thereof.

In a further advantageous embodiment, the device has a heating unit that is arranged in a transport unit for the plastic containers upstream of the forming stations. This heating unit can heat the plastic preforms.

In a further advantageous embodiment, the device has a further transport unit that transports the manufactured containers from the forming stations to the inspection unit. It is advantageous that the introduction area is arranged in an area of this further transport unit. Thus, for example, a transport unit can be provided, such as in particular, but not exclusively, a transport star that removes the blown containers from the forming stations and transports them for further processing.

Preferably, this further transport unit also has a plurality of holding elements. Advantageously, these holding elements are gripping clamps that can grip the manufactured containers in one area of them, for example in the mouth area thereof. These gripping clamps can be placed around the mouths of the containers. Preferably, these gripping clamps can be operated manually, so that a user can insert a container and especially a test container into these gripping clamps. It is also conceivable that the transport unit can be operated in a test mode, for example in a mode in which the containers can be transported in front of the inspection unit and stopped there and precisely measured.

In a further advantageous embodiment, the device has at least one test container that has a known wall thickness in at least one area of a wall of the test container. Preferably, this test container can be introduced into the device via the introduction area. Advantageously, this is a test container that has been formed using the corresponding forming unit.

In a further advantageous embodiment, the device also has a control unit that controls the unit for forming plastic preforms into plastic containers. Advantageously, this control unit controls the unit for forming and in particular the individual forming stations on the basis of a test result that was determined by said inspection unit. Advantageously, the control unit is also suitable and intended to control a heating unit for heating the plastic preforms.

In another advantageous design, the device has a storage unit that is suitable and intended to document the measurement results determined by the inspection unit and in particular the determined wall thickness.

Preferably, the values determined by the storage unit can also be measured with a date specification and in particular also with an association with the respective test container. For this purpose, the inspection unit also has an image recording unit that is suitable and intended to record a mark that is located on the test containers. In particular, this is a mark such as a two-dimensional code that allows the test container to be uniquely identified.

In particular, the device according to the invention also has a set of test containers. These test containers may differ in particular in their respective wall thicknesses.

The present invention is further directed towards a test container for inspecting an inspection unit and in particular a wall thickness inspection unit. This test container has a bottom area, a base body adjoining the bottom area and a mouth area adjoining this base body. This container is made of a plastic material and particularly preferably of PET.

Furthermore, according to the invention, the base body has a wall area with defined or known wall thicknesses. Advantageously, the respective wall thicknesses change in a longitudinal direction and/or in a circumferential direction of the container and in particular also in a longitudinal direction of the container.

BRIEF DESCRIPTION OF THE DRAWINGS

Further advantages and embodiments can be seen from the attached drawings, wherein.

DETAILED DESCRIPTION OF THE INVENTION

Figure 1:
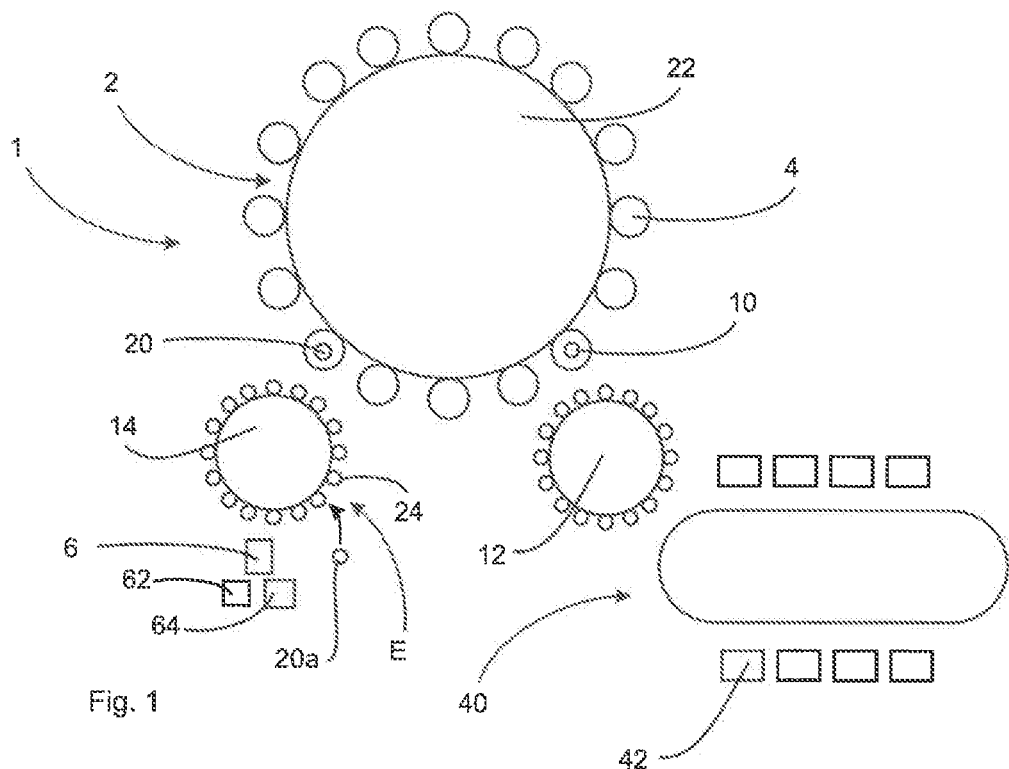
FIG. 1 shows a schematic representation of a device according to the invention.

FIG. 1 shows a schematic representation of a device 1 according to the invention for forming plastic preforms into plastic containers. This device has a heating unit 40 that is used to heat plastic preforms. In this embodiment, this heating unit has a plurality of heating elements which are arranged to be stationary and past which the plastic preforms are transported. This heating unit 40 is followed by a transport unit 12 in the form of a transport star that feeds the heated plastic preforms to the individual forming stations 4. These forming stations 4 are arranged on a movable and especially rotatable carrier 22, such as in particular, but not exclusively, a so-called blow wheel 22. In an alternative machine design, the forming stations can be arranged e.g. on a linear transport line. The plastic preforms 10 are fed to the individual forming stations and are formed into plastic containers and in particular plastic bottles 20 in the production operation by applying compressed air thereto. Reference numeral 2 identifies in its entirety the transport unit that transports the plastic preforms and/or also the forming stations 4.

Reference numeral 14 identifies a further transport unit, such as in particular a further transport star, which transports the manufactured plastic containers 20 away from the forming stations and, for example, transports them to a further station (not shown).

Reference sign E indicates an introduction area into which test containers are introduced. Reference numeral 6 identifies the inspection unit, which in particular carries out a wall thickness measurement of the individual manufactured plastic containers. This inspection unit 6 works in particular in a contactless manner. The introduction area E is designed in such a way that individual plastic containers or plastic bottles, but also sets of test containers can be introduced into the area between the forming stations 4 and the inspection unit 6. Within the scope of a special test mode, the inspection unit 6 checks the wall thicknesses of the individual plastic containers and preferably also stores them. For this purpose, the device has a storage unit 62 that stores the determined wall thicknesses values. Preferably, the device also has a comparison unit 64 that compares the wall thicknesses determined by the inspection unit with the actual wall thicknesses of the test containers.

Preferably, the inspection unit measures the wall thicknesses in several areas of the plastic preforms along their longitudinal direction. In FIG. 1, the longitudinal direction of the plastic preforms 10 and also of the plastic containers 20 is perpendicular to the plane of the figure.

Figure 2:
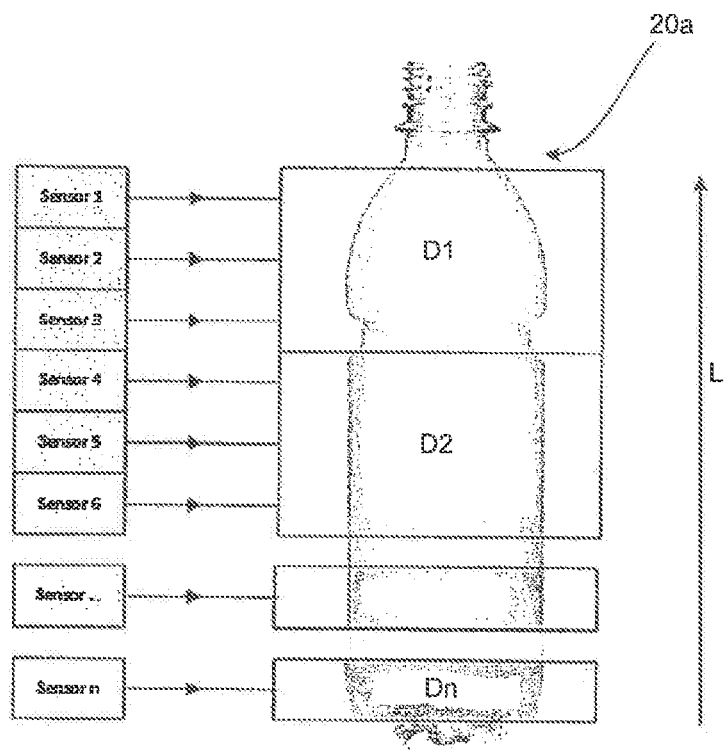
FIG. 2 shows a representation of an evaluation of a test container.

FIG. 2 illustrates the inspection of the inspection unit 6. The inspection unit 6 has a plurality of sensors from sensor 1 to sensor n. Each of these sensors is suitable and intended for determining the wall thickness of the blown plastic containers. These sensors are preferably arranged one above the other in a longitudinal direction L of the container 20a, so that they can measure in this longitudinal direction L areas of the wall of the containers that are located one above the other.

The plastic container 20, or in this case the test container 20a, has varying wall thicknesses in individual areas of its base body. These areas are marked here with D1, D2 and Dn. The individual sensors of the inspection unit measure these wall thicknesses and preferably the individual wall thicknesses are stored. Furthermore, it is also possible that the measured wall thicknesses of the test container 20a can be output, for example as a histogram, by means of a display unit. Furthermore, the wall thicknesses measured by the inspection unit 6 are compared with the actual (known) wall thicknesses of the test container 20a. In this way it can be determined whether the inspection unit is working properly, and this inspection can in particular be carried out independently for the individual sensors.

For example, it might be possible that this check reveals that individual sensors, such as sensor 4, are not working properly. This could mean that this sensor would have to be replaced, at least in the medium or long term, or that the sensor would have to be recalibrated. However, for a temporary working operation, it is also possible that in production operation the results of this sensor 4 are not taken into account or are excluded when assessing whether a container has been properly blown. The device is therefore preferably also equipped with a control unit and/or a processor unit, which has the effect of determining, depending on a test result, whether individual sensors of the inspection unit are activated or not or whether the measurement results output by these individual sensors should be taken into account in the working mode.

The applicant reserves the right to claim all the features disclosed in the application documents as being essential to the invention in as far as they are novel, either individually or in combination, compared to the prior art. It is further pointed out that the individual figures also describe features that may be advantageous if taken by themselves. A person skilled in the art will immediately recognise that a certain feature described in a figure may be advantageous even without adopting further features from that figure. Furthermore, a person skilled in the art will recognise that advantages may also result from a combination of several features shown in individual or different figures.

LIST OF REFERENCE NUMERALS

1 Device
2 Complete transport unit
4 Forming stations
6 Inspection unit
10 Plastic preforms
12 Transport unit
14 Further transport unit/further transport star
20 Plastic bottles
20a Test container
22 Carrier, blow wheel
40 Heating unit
42 Heating element
62 Storage unit
64 Comparison unit
E Introduction area
D1, D2, Dn Wall thicknesses
L Longitudinal direction

The invention claimed is:

1. A method for inspecting an inspection unit which in at least one area of a device for forming plastic preforms into plastic containers determines a wall thickness of the plastic containers, wherein the device has a transport unit, on which a plurality of forming stations for forming plastic preforms into plastic containers is arranged, and the inspection unit is arranged downstream of the forming stations in a transport direction of the plastic containers and is configured to determine the wall thickness of formed plastic containers in at least one region of the plastic containers produced,
comprising the following steps:
introducing between the forming stations and the inspection unit at least one test container that has a predetermined and/or known wall thickness at least in sections, and
determining a first wall thickness in at least one area of a test container by the inspection unit,
introducing at least one test container downstream of the forming stations in the transport direction of the plastic containers.

2. The method as claimed in claim 1,
wherein
the inspection unit determines the wall thickness of the test container in several regions of the plastic container, these regions being arranged one above the other in a longitudinal direction of the plastic container.

3. The method as claimed in claim 1,
wherein
the at least one test container has wall thicknesses that deviate in its longitudinal direction.

4. The method as claimed in claim 1,
wherein
several of the test containers are introduced.

5. The method as claimed in claim 1,
wherein
at least one test result is output with data which are characteristic of the at least one test container.

6. The method as claimed in claim 1,
wherein
the at least one test container is introduced downstream of the forming stations in the transport direction of the plastic containers.

7. The method as claimed in claim 1,
wherein
the inspection unit determines the wall thickness of the plastic container in several regions of the plastic container, these regions being arranged one above the other in a longitudinal direction of the plastic container.

8. The method as claimed in claim 1,
wherein
the test container has wall thicknesses that deviate in its longitudinal direction.

9. The method as claimed in claim 1,
wherein
several test containers are introduced.

10. The method as claimed in claim 1,
wherein
at least one test result is output with data which are characteristic of the test container.

11. The method as claimed in claim 1,
wherein
the wall thickness determined by the inspection unit is compared with the known wall thickness of the test container.

12. A device for forming plastic preforms into plastic containers, the device having a transport unit, on which a plurality of forming stations for forming plastic preforms into plastic containers is arranged, and an inspection unit that is arranged downstream of the forming stations in a transport direction of the plastic containers and that determines a wall thickness of formed plastic containers in at least one region of the formed plastic containers produced,
wherein
the device has an introduction area, within which plastic test containers can be fed to the machine, wherein the test containers are introduced downstream of the forming stations in the transport direction of the plastic containers.

13. The device as claimed in claim 12,
wherein
the device has a further transport unit that transports the manufactured containers from the forming stations to the inspection unit, and the introduction area is arranged in a region of this further transport unit.

14. The device as claimed in claim 12,
wherein
the device has at least one test container that has a known wall thickness in at least one region, which test container can be introduced into the device via the introduction region.

15. The device as claimed in claim 13,
wherein
the device has at least one test container that has a known wall thickness in at least one region, which test container can be introduced into the device via the introduction region.

* * * * *